(12) United States Patent
Kalinowski

(10) Patent No.: US 7,075,035 B2
(45) Date of Patent: Jul. 11, 2006

(54) HOT WIRE CONTROL APPARATUS AND METHOD

(75) Inventor: Michael A. Kalinowski, Merrimack, NH (US)

(73) Assignee: Shanklin Corporation, Ayer, MA (US)

( * ) Notice: Subject to any disclaimer, the term of this patent is extended or adjusted under 35 U.S.C. 154(b) by 0 days.

(21) Appl. No.: 10/979,379

(22) Filed: Nov. 2, 2004

(65) Prior Publication Data

US 2006/0091127 A1    May 4, 2006

(51) Int. Cl.
*H05B 3/08* (2006.01)
(52) U.S. Cl. .................. 219/241; 219/512; 219/494; 219/243
(58) Field of Classification Search ............. 219/241, 219/512, 494, 243, 509; 338/316; 156/583.1, 156/583.2, 583.7, 583.9
See application file for complete search history.

(56) References Cited

U.S. PATENT DOCUMENTS

| | | | |
|---|---|---|---|
| 1,671,300 A | 5/1928 | MacDonald et al. | 219/388 |
| 3,283,126 A | 11/1966 | Velyel | 219/243 |
| 3,569,667 A | 3/1971 | Ryswick | 219/243 |
| 3,721,801 A | 3/1973 | Bate | 219/243 |
| 3,746,838 A | 7/1973 | Drugmand | 219/512 |
| 3,840,722 A | 10/1974 | Mayer et al. | 219/243 |
| 3,883,720 A | 5/1975 | Snider | 219/535 |
| 3,965,333 A | 6/1976 | Elsner et al. | 219/243 |
| 3,976,196 A | 8/1976 | Mueller | 206/526 |
| 3,989,926 A | 11/1976 | Yoshizawa et al. | 219/216 |
| 4,288,271 A | 9/1981 | Campbell, Jr. et al. | 156/359 |
| 4,377,738 A | 3/1983 | Berg | 219/490 |
| 4,856,260 A | 8/1989 | Woo et al. | 53/373 |
| 4,964,944 A | 10/1990 | Christine et al. | 156/515 |
| 5,321,230 A | 6/1994 | Shanklin et al. | 219/492 |
| 5,597,499 A | 1/1997 | Dunn | 219/243 |
| 5,603,801 A | 2/1997 | DeFriese et al. | 156/515 |
| 5,791,125 A | 8/1998 | Kallner | 53/477 |
| 6,822,203 B1 | 11/2004 | Hayward | 219/512 |

FOREIGN PATENT DOCUMENTS

FR    1.136.990    5/1957
GB    901574    7/1962

OTHER PUBLICATIONS

Copy of European Search Report dated Apr. 28, 2004.

*Primary Examiner*—Robin Evans
*Assistant Examiner*—Vinod Patel
(74) *Attorney, Agent, or Firm*—Nields & Lemack

(57) ABSTRACT

Control system and apparatus for controlling current input to an electrical resistance element such as a seal wire. The system and apparatus of the present invention is a closed loop feedback modification to conventional systems, and takes advantage of the inherent expansion of the seal wire as it is heated. The feedback mechanism monitors the length of the sealing wire, and adjusts the current applied to the wire, responsive to that monitored length.

5 Claims, 5 Drawing Sheets

DETAIL C
SCALE 1 : 2

HOT WIRE CONTROL APPARATUS AND METHOD

BACKGROUND OF THE INVENTION

Packaging machines for wrapping and sealing plastic film about an article conventionally utilize a heated wire to seal film layers to one another and to melt through the layers in order to separate one article from another as the articles pass through the machine. Current is supplied to the wire to heat the wire to a high temperature in order to effect the seal and cutting operation. The appearance of the resulting seal is fine and neat as the film shrinks tightly around the package, especially where polypropylene films are involved. Such hot wires are typically used to form both end seals and side seals.

As the wire contacts the film and performs its intended function, it loses heat to the film as well as to the surrounding environment. Accordingly, current must be continually or continuously supplied to the wire in order to maintain the appropriate wire temperature.

Typically the wire is a resistive element approximately 45–50 thousandths of an inch in diameter, therefore making it susceptible to temperature build-up, fatigue and failure. Thus, if the current to the wire is not properly controlled and the wire temperature becomes too high, the wire tends to break. For example, as machine speed increases, the current impulse sent to the seal wire to heat the wire to the appropriate temperature becomes more and more frequent, until such point that the seal system is, in effect, on at all times. The wire becomes more susceptible to failure as the film being sealed is not drawing away the excess heat (acting as a heat sink) as fast as the heat is being applied to the wire. The wire eventually softens, stretches, and breaks. This is a common occurrence particularly when proper operator attention is absent. Changing the wire requires that the machine be shut down, resulting in considerable loss of productivity.

U.S. Pat. No. 5,597,499 addresses this problem by providing a seal wire control system that controls the duration of heat impulses applied to the sealing wire. It utilizes an open loop configuration that regulates the heat applied to the seal wire based on the number of articles and the frequency that the articles are run through the wrapper. However, the versatility of this solution is limited.

U.S. Pat. No. 6,822,203 addresses this problem by monitoring the expansion of the sealing wire. It utilizes a closed loop configuration that regulates the current applied to the wire based on the length of the wire. When the wire expands to a certain threshold length, the current applied to the seal wire is reduced or eliminated. After the wire has sufficiently cooled so as to contract to a length less than the threshold, the current applied is restored. This represents an improvement over the prior configurations, but still requires adjustments when the cycle rate of the packaging machine is adjusted. If these adjustments are not made, the sealing wire will last longer than one controlled by an open loop configuration, but may still fail prematurely due to fatigue.

It would be desirable to provide a seal system that is a closed loop feedback configuration that detects the expansion and contraction of the wire, and adjusts the current so as to regulate the length of the wire in order to protect it from fatigue and failure.

These and other objects will be made apparent by reference to the following description and drawings.

SUMMARY OF THE INVENTION

The problems of the prior art have been overcome by the present invention, which provides a control system and apparatus for controlling current input to an electrical resistance element such as a seal wire. The system and apparatus of the present invention is a closed loop feedback modification to conventional systems, and takes advantage of the inherent expansion of the seal wire as it is heated. The feedback mechanism monitors the length of the sealing wire, and adjusts the current applied to the wire, responsive to that monitored length.

The device of the present invention thus directly monitors the expansion and contraction of the seal wire, and adjusts the current applied to the seal wire, such as by using an algorithm, such as a PID (Proportional, Integral, Derivative) Loop, based on the monitored length. Using this technique, wire stress and fatigue are reduced, allowing greater wire life.

In a preferred embodiment, the variable current source comprises a transformer with its secondary winding connected to the sealing wire. The current passing through the secondary winding is determined by the current passing through the primary winding. The primary winding is regulated by a proportional control circuit, which adjusts the duty cycle of the incoming alternating current. This proportional control circuit receives its input from a controller, which in turn receives its input from a proximity sensor. The proximity sensor generates an output which is responsive to the amount of expansion and contraction in the sealing wire. This output is then used to control the proportional control circuit which in turn determines the amount of current to apply to the sealing wire. This sequence is repeated, preferably continuously, thereby maintaining the length of the sealing wire. By continuously monitoring the length of the sealing wire, the durability and life of the wire are greatly improved.

DETAILED DESCRIPTION OF THE INVENTION

Figure 1:
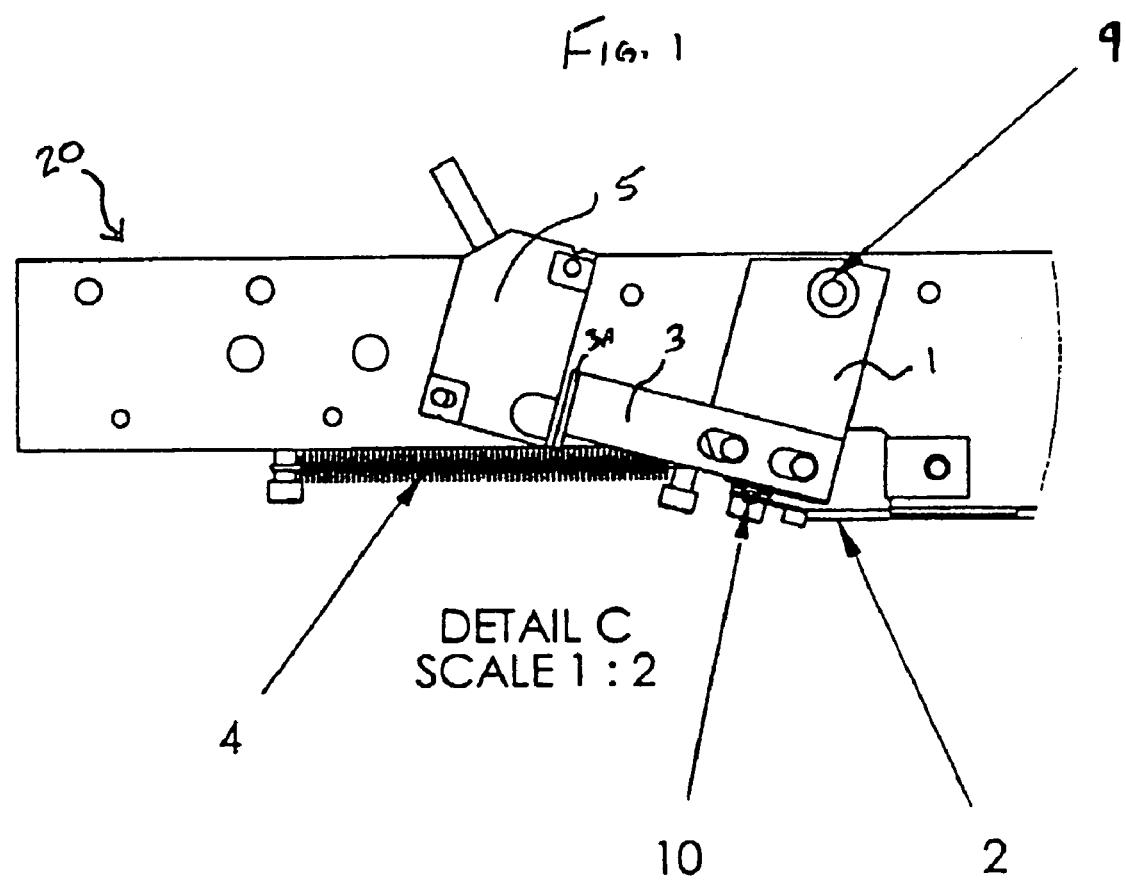
FIG. 1 is a partial front view of an end seal assembly in accordance with the present invention.

Turning now to the figures, there is shown a portion of an end seal assembly for a packaging machine in accordance with one embodiment of the present invention. It should be understood that the end seal assembly is shown by way of illustration, as the present invention is not limited to any particular location of the sealing mechanism. Top jaw 20 is shown (FIG. 1), which is conventionally sandwiched by a pair of opposite film clamps coupled via a film guard mount (not shown), the mount being coupled, in turn, to the top jaw 20. One end of an electrical impulse element such as a seal wire 2 is fixed to the underside of the top jaw 20 with a wire tension block (not shown). The opposite moving or floating end of seal wire 2 is coupled to a seal wire pivot member 1 at wire terminal 10. A pivot member 1 is pivotally mounted on the top jaw 20 at pivot point 9 so that it moves in response to expansion and contraction of the seal wire 2, depending upon the seal wire temperature. A detector actuator 3 is mounted to the seal wire pivot plate or block 1, and extends beyond the pivot member 1 towards detector 5 as shown. Preferably the actuator 3 terminates in a flange portion 3A to provide sufficient surface area to actuate proximity detector 5 as discussed in greater detail below. One end of biasing member 4, such as a coil spring, is fixed to the actuator 3 and the opposite end of the biasing member 4 is fixed to the top jaw 20 so as to maintain the actuator 3 (and pivot member 1) under tension, and bias the actuator and thus the seal wire 2 in a direction away from wire tension block 8.

Figure 4:
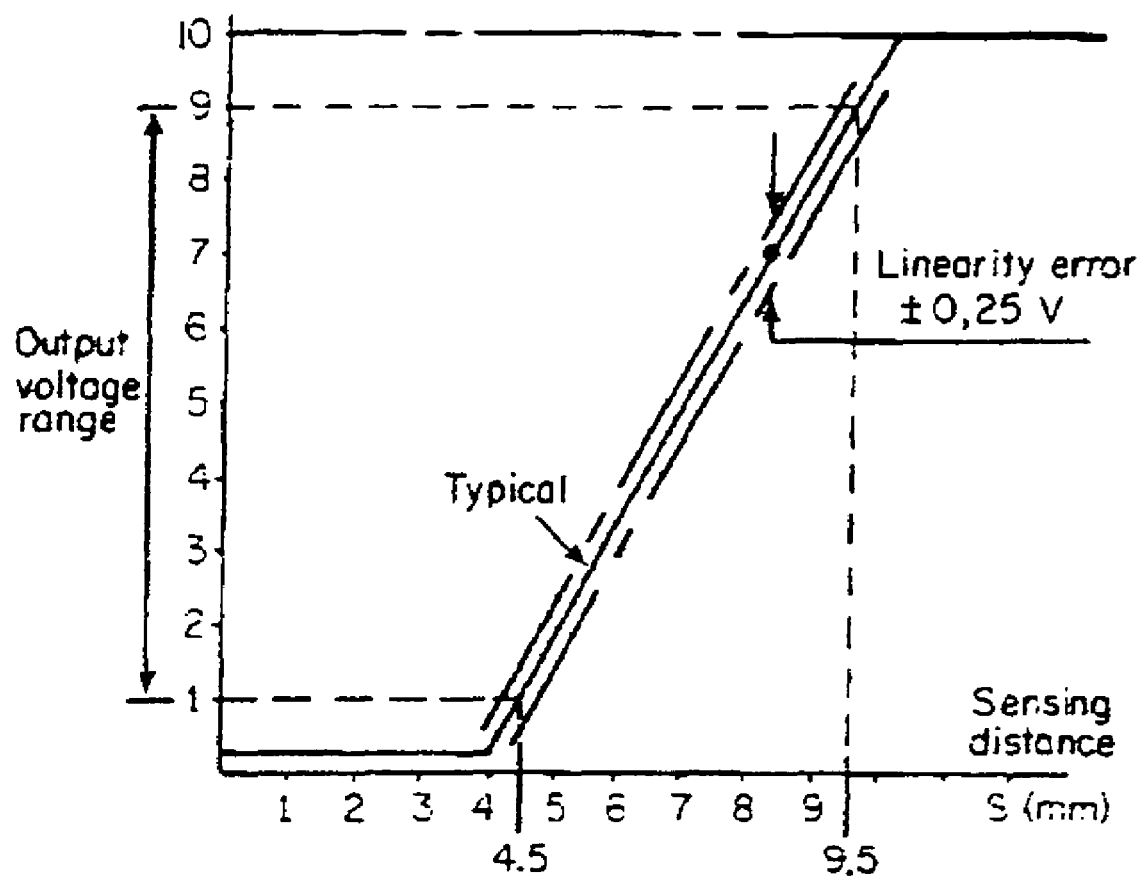
FIG. 4 is a graph illustrating the output of a representative proximity sensor in accordance with the present invention.

Spaced a set distance from the actuator 3 is a detector 5, such as a proximity sensor. Other detectors, such as optical detectors, capable of monitoring the expansion and contraction of seal wire 2 are suitable and within the scope of the present invention. As current is applied to the seal wire 2 and the seal wire 2 heats up and expands, the expansion is accommodated by the pull force of the biasing member 4 and the pivoting action of the pivot member 1. As a result, the pivot member 1 pivots in a clockwise direction from the position shown in FIG. 2 to the position as viewed in FIG. 1, driving actuator 3 towards the sensor of the detector 5. The detector 5 senses the distance between itself and actuator 3 and generates an output responsive to that distance. In the preferred embodiment, a response linearly proportional to the distance between the detector 5 and the actuator 3 is produced, as illustrated in FIG. 4. Based on that output, the current applied to the seal wire 2 is varied in an attempt to maintain a roughly uniform wire length. Thus, when the output of detector 5 indicates that actuator 3 is closer than desired (and therefore too hot), the amount of current applied to seal wire 2 is reduced. Now with a reduced application of current, the seal wire 2 cools and contracts, and the pivot member 1 and actuator 3 are pulled in a counter-clockwise direction as viewed in FIG. 2. This increases the distance between the detector 5 and the actuator 3, which in turns increases the output from the detector 5. Conversely, when the output of detector 5 indicates that actuator 3 is further away than desired (and therefore too cool), the amount of current applied is increased, thereby heating the seal wire 2. Now with an increased application of current, the seal wire 2 heats and expands, and the pivot member 1 and actuator 3 are pulled in a clockwise direction as viewed in FIG. 1. This decreases the distance between the detector 5 and the actuator 3, which in turns decreases the output from the detector 5.

Figure 3:
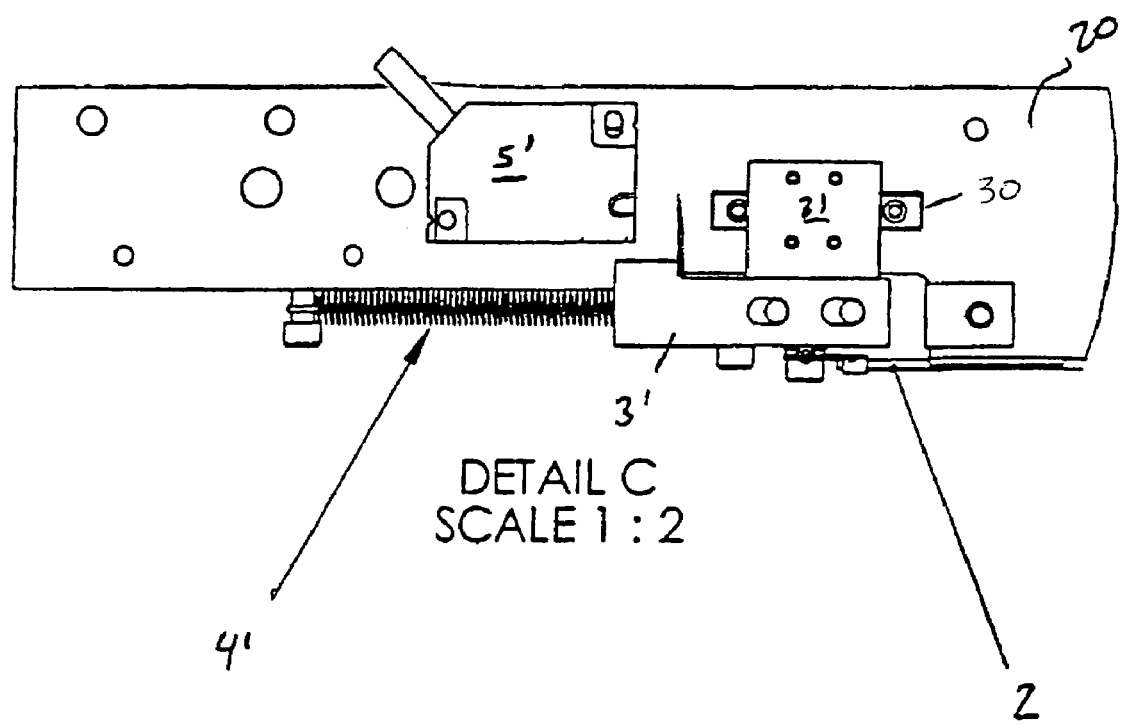
FIG. 3 is a partial front view of an end seal assembly in accordance with another embodiment of the present invention.

Other means of determining the length of the seal wire 2 can be used and are within the scope of the present invention. For example, rather than utilizing a pivoting pivot member 1, as in FIG. 1, a linear system, illustrated in FIG. 3, could be used. FIG. 3 shows an embodiment where the actuator moves linearly rather than pivoting. Linear guiderail 30 supporting block 31 is coupled to top jaw 20. In this embodiment, proximity switch 5' is placed so as to be able to sense the movement of actuator 3'. Thus, when actuator 3' is in the position shown in FIG. 3, the seal wire 2 has not yet expanded. Biasing member 4', such as a compression or extension spring, is attached to a wire tension block (to which the actuator 3' is also connected) and holds the seal wire 2 in tension as before. As the wire 2 heats up and expands, the actuator 3' travels linearly (to the left in FIG. 3) toward the detector 5'. This causes a reduction in the output of the proximity sensor, which in turn lowers the current applied to seal wire 2. As seal wire 2 cools, it contracts, the actuator 3' travels linearly (to the right in FIG. 3) away from detector 5'. This causes an increase in the output of proximity sensor, which in turn increases the current applied to seal wire 2.

Figure 2:
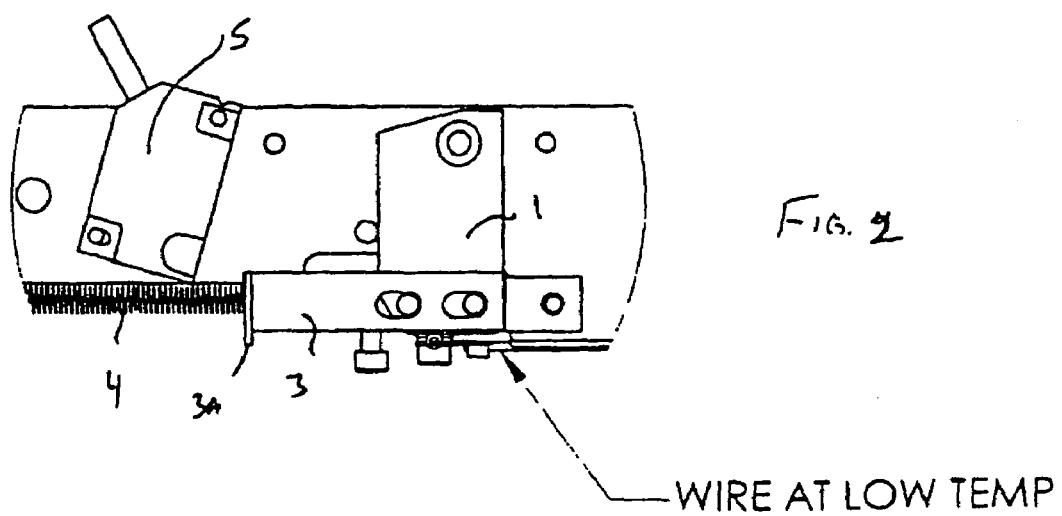
FIG. 2 is a partial front view of an end seal assembly with the seal wire at low temperature in accordance with the present invention.

In another embodiment, instead of a proximity sensor, a potentiometer is used. In this embodiment, the potentiometer generates an output based on rotational movement. The potentiometer is placed at pivot point 9 (FIG. 1). As the length of the seal wire 2 changes, pivot member 1 rotates about pivot point 9. Therefore, the length of seal wire 2 can be determined based on the angle of rotation of pivot member 1. The rotational movement of pivot member 1 caused a corresponding change in output from the potentiometer. This output can then be used in the same manner as the output of the proximity sensor, as will be described later. Those skilled in the art will appreciate that other methods of measuring the length of the seal wire are also possible, and this description is not meant to limit the invention to only these embodiments.

Figure 5:
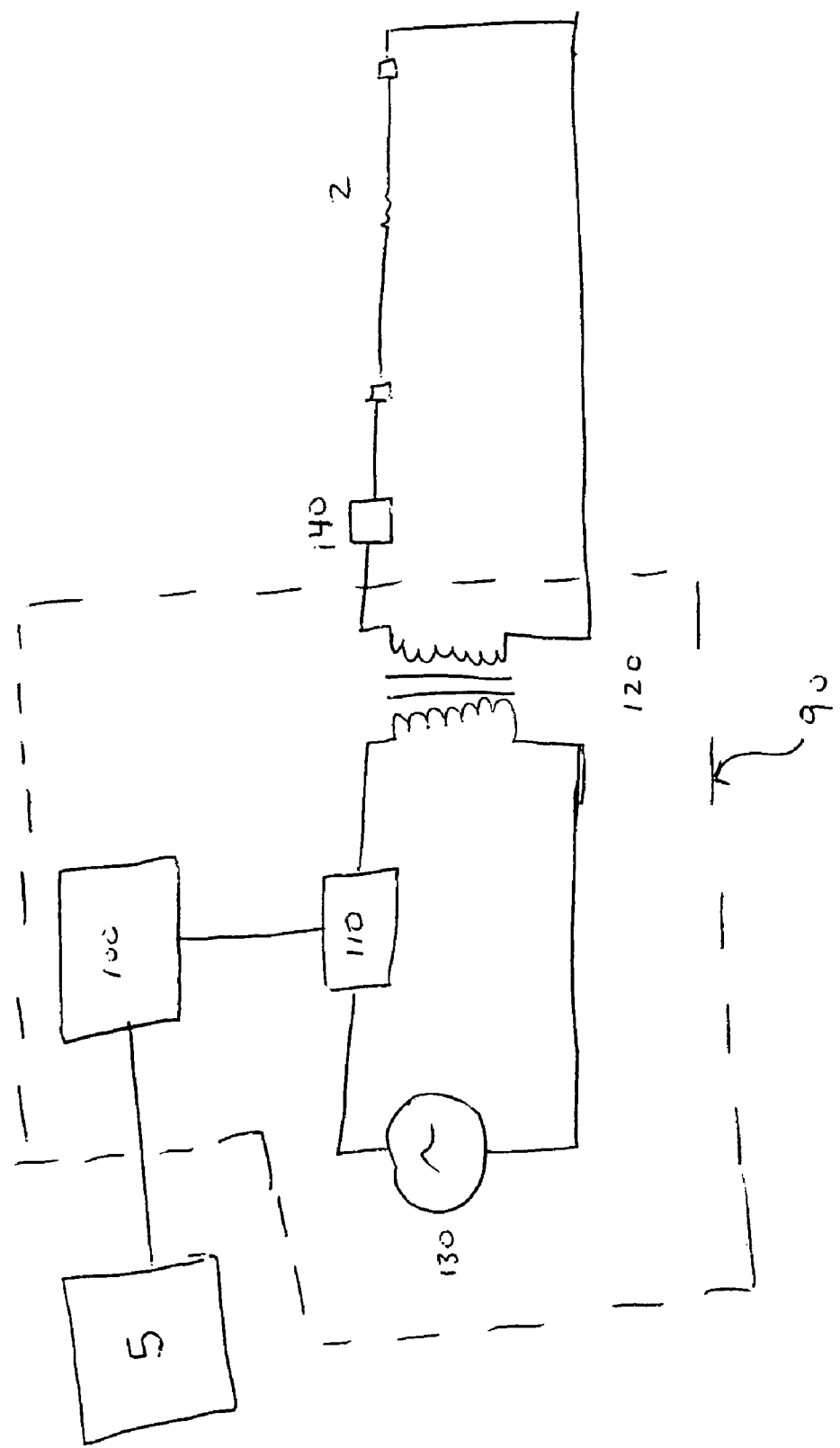
FIG. 5 is a schematic drawing of the preferred embodiment of the present invention.

FIG. 5 illustrates an embodiment of the circuitry used to produce the varying current that is applied to the seal wire. As described above, the detector 5, preferably a proximity sensor, generates an output which is responsive to the length of the seal wire. In the preferred embodiment, there is a linear relationship between the output of the detector and measured distance between the actuator and the detector, as shown in FIG. 4. That output from detector 5 is received by power supply 90, which creates a variable applied current in response to the received input. In the preferred embodiment, power supply 90 comprises a processing unit 100, a proportional control unit 110, a transformer 120, and an AC power source 130, each of which are described in greater detail below.

Processing unit 100 receives the input from detector 5, which in the preferred embodiment ranges from 0 to 10 volts. The processing unit then utilizes an algorithm to determine the appropriate amount of current to apply to the seal wire, based on this input. In the simplest embodiment, the processing unit 100 simply passes the received signal to the proportional control circuit 110. This method allows constant adjustment of the current applied, however, it may cause instability, unacceptable transient response, or steady state errors.

In a second embodiment, the processing unit 100 comprises a PID (Proportional, Integral, Derivative) controller. PID controllers produce an output based on three components, a first component that is proportional to the incoming signal, a second component which is based on the derivative of the incoming signal and a third component based on the integral of the incoming signal. Each of these components affects the output of the PID controller. For example, the derivative component increases the stability of the system, decreases overshoot and improves transient response. The integral component reduces steady state error, but increases overshoot and transient response. The proportional component will decrease the rise time of the output, and will reduce, but never eliminate, steady-state errors. Each of these components has an associated gain, including a value of zero if that particular component is not to be utilized in creating the output. Adjustments to these gain values affect the resulting output from the PID controller. Those skilled in the art are aware that these gains can be optimized for a particular application through empirical means, or by using one of the simulation tools currently available in the art.

Those skilled in the art are aware that there are various embodiments of a PID controller. In the preferred embodiment, a PLC, or programmable logic controller is used to implement this function. In an alternate embodiment, a discrete PID controller, such as those manufactured by Gefran, is used. This alternate embodiment is especially useful when retrofitting an existing machine.

A proportional control circuit 110 receives the output generated from the processing unit 100. The proportional control circuit is in series between transformer 120 and AC power source 130. The proportional control unit acts to control the current passing through the primary winding of transformer 120 by regulating its duty cycle. Briefly, the current waveform from the voltage source 130 is typically sinusoidal. The proportional control circuit 110 modifies this sinusoidal input by passing only a portion of that input to the primary winding. To do this, the proportional control circuit 110 divides the incoming waveform into small time periods. During each time period, the circuit 110 allows the input to pass during a certain percentage of the time, while inhibiting it during the rest of the time period. A duty cycle of 100% signifies that the input passes unaltered to the primary winding, while a duty cycle of 0% signifies that none of the input passes to the primary winding. A duty cycle of 50% indicates that the input is passed to the primary winding during 50% of each time period. In the preferred embodiment, the output of the processing unit is linearly proportional to the desired duty cycle. Thus, if the output from processing unit 110 was in the range from 0 to 10 volts, the duty cycle would be equal to the received voltage multiplied by 10. For example, an output of 4 volts from the processing unit 100, would cause the proportional control circuit to utilize a 40% duty cycle. While, this linear relationship is preferred, other embodiments are equally applicable and the invention is not limited to this embodiment.

By modulating the input current waveform in this manner, the average current passing through the primary windings of the transformer 120 is controlled. Furthermore, as is true of all transformers, the current through the primary winding is directly proportional to the current through the secondary winding. Thus, variations made to the current passing through the primary winding produce similar variations in the current that is applied to the seal wire 2, which is connected to the secondary winding.

A visual reference 140, such as an ammeter, can optionally be inserted in series between the transformer 120 and the seal wire 2 to provide the operator with an indication of the amount of current passing through the seal wire.

In the preferred embodiment, the detector 5 continuously monitors the length of the seal wire 2, and the processing unit 100 continuously adjusts the current applied to the seal wire 2. In an alternate embodiment, the output generated from the detector 5 is sampled at regular intervals by the processing unit 100, which then generates and transmits its output at regular intervals. Thus, rather than a continuously varying output from processing unit 100, there is an output generated at discrete points in time, which are used to control the current applied to the seal wire 2. The frequency at which the processing unit samples the input from the detector and generates its output is based on the implementation of the system. This present invention does not limit this sampling frequency and is applicable to both continuously and discretely sampled systems.

In the preferred embodiment, the pivot member and biasing member are able to compensate for approximately one inch of expansion and contraction in the seal wire. For example, an expansion of 0.0 inches would indicate a cool wire, while an expansion of one inch would be a maximally heated seal wire. The length of the expansion is proportional to the temperature of the wire. The controller has a default wire expansion setting, such as ½" of expansion. The system will then monitor the length of the wire and adjust the current applied to it in order to maintain the length of the seal wire at this desired length. Thus, by monitoring the difference between the actual length of the seal wire and the desired length, the length of the wire can be maintained to within about ⅛" of the desired value by properly controlling the current applied to the seal wire using the present invention.

The present invention is able to maintain this tolerance during a variety of different levels of sealing activity. For example, when the seal wire is used to seal at a high rate, the sealing material, such as plastic, provides a heat sink for the seal wire due to the amount of time that there is direct contact between them. As the sealing material sinks heat from the seal wire, the seal wire cools and therefore contracts. The present invention detects this contraction and appropriately increases the current applied to the seal wire to restore the desired length. Conversely, when the sealing operation is used at a low rate, the effect of the sealing material to serve as a heat sink is reduced since they are in contact much less often. Therefore, the wire will heat and begin to expand. Again, the present invention detects this expansion and appropriately decreases the current applied to the seal wire. The present invention can automatically adapt to varying levels of sealing activity due to the closed loop control system.

The operator of the machine equipped with the present invention can optionally modify the default setup parameters by adjusting the PID controller's nominal settings to a value that provides an adequate seal based on strength and appearance. Once this adjustable setting is determined, the machine requires no further adjustment, regardless of speed since the closed loop control will ensure constant length and temperature.

The above description refers to the optimization of the PID controller's settings to be used while the machine is actively engaged in the sealing operation. In addition to this setting, it is also optionally possible to control the length, and therefore the temperature, of the seal wire during periods of machine inactivity.

In a first embodiment, the PID controller incorporates a single set of settings. Thus, the seal wire will be maintained at the same length, and therefore temperature, regardless of whether the machine is actively engaged in the sealing process or is inactive.

In a second embodiment, a second set of PID controller settings is used during times of machine inactivity. For example, the controller may detect that the machine is idle based on a predetermined period of inactivity, or the inactivity of the feeder belt. Based on this information, the machine automatically switches to a second PID controller setting. This second setting is typically lower than the operational setting and serves to minimize wire fatigue and improve transient response. In this embodiment, upon detection of machine inactivity, the controller employs the second setting. The machine then switches to the previous optimized setting when the machine is again engaged in the sealing operation. The second set of PID controller settings can be generated using a number of different mechanisms.

In one embodiment, the PID controller maintains a second set of predetermined values, specifically for use during periods of machine inactivity. Upon detection of inactivity, the PID controller uses this second set of values to maintain the seal wire at an appropriate length, and therefore temperature.

In another embodiment, the user is able to define the second set of values to be used during periods of machine inactivity. The user can therefore determine the temperature at which the seal wire will remain during periods of machine inactivity. This choice is based on many factors, such as wire fatigue, time to reach operational temperature, and other factors.

The present invention can be readily retrofitted on existing equipment simply by adding the external PID controller, actuator, detector, and appropriate circuitry to modify the power source.

What is claimed is:

1. Apparatus for controlling the temperature of an electrical resistance heating element, comprising:
    an electrical resistance heating element, susceptible to fatigue and failure, having a fixed portion and a movable portion mounted to a movable member, said movable member adapted to move in response to the expansion and contraction of said element;
    a detector for detecting movement of said movable member and creating a first electrical signal responsive to said movement of said movable member; and
    a power supply to supply variable current to said element, comprising a controller adapted to receive said first electrical signal, wherein said controller utilizes proportional, integral and derivative control to adjust said current in response to said first electrical signal.

2. The apparatus of claim 1, wherein said controller is adapted to generate a second electrical signal responsive to said first electrical signal.

3. The apparatus of claim 2, wherein said power supply further comprises a transformer having primary and secondary windings, an alternating current voltage source, and a circuit, interposed in series between said voltage source and said primary winding, adapted to vary the duty cycle of said voltage source in response to said second electrical signal.

4. The apparatus of claim 1, wherein said heating element comprises a wire.

5. The apparatus of claim 4 wherein the diameter of said wire is approximately 45–50 thousandths of an inch.

* * * * *